United States Patent Office 2,891,060
Patented June 16, 1959

2,891,060

BRIDGEHEAD NITROGEN COMPOUNDS

Bernard Rudner, Baltimore, Md., assignor to W. R. Grace & Co., New York, N.Y., a corporation of Connecticut No Drawing. Application November 18, 1955
Serial No. 547,831

1 Claim. (Cl. 260—248.5)

This invention relates to bridgehead nitrogen compounds, and in one specific aspect, it relates to quaternary salts which can be described as bridgehead nitrogen hydrazinium chlorides.

A bridgehead nitrogen compound is an organic compound, the molecular structure of which contains at least two mutually fused rings sharing a common nitrogen (the bridgehead N) and at least one other atom. Two common examples are:

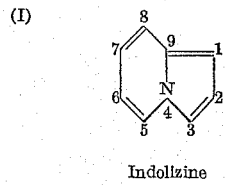

Indolizine

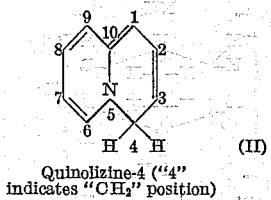

Quinolizine-4 ("4" indicates "$CH_2$" position)

Although alkyl quaternary salts of these bridgehead nitrogen compounds are well known, heretofore, quaternary hydrazinium salts of such compounds were unknown. While it may have been possible to derive a theoretical preparation of these hydrazinium salts, as a practical matter they had never been prepared.

It has recently been discovered that chloramine will react with a tertiary amine to give the corresponding 1,1,1-trisubstituted hydrazinium chloride. This reaction has opened a wide field of potential chemistry relating to hydrazine derivatives as it provides a feasible commercially acceptable way of obtaining many heretofore unknown compounds. Tertiary amines are readily available bases, and chloramine can be obtained economically by the well-known process of Harry H. Sisler et al., U.S. Patent No. 2,710,248, where chlorine and ammonia are reacted in the vapor phase to produce chloramine (monochloramine).

I have found that application of this useful reaction to those tertiary amines in which a basic N atom is a bridgehead nitrogen has yielded a totally novel class of compounds, referred to above as bridgehead hydrazinium chlorides. Their preparation may be exemplified by the reaction:

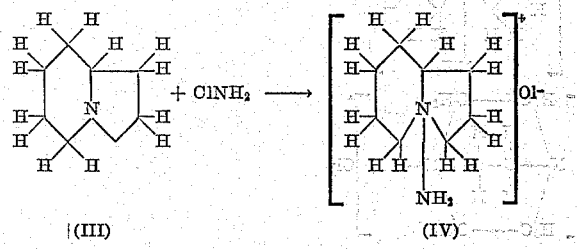

(III) Pyrrocoline (octahydroindolizine)

(IV) 4-aminopyrrocolinium chloride

The product structure indicated in the typical foregoing reaction also serves to suggest a more exact name for particular members of this family.

In accordance with the present invention, I have discovered a new class of compounds of the general formula:

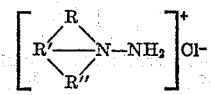

where R, R', and R" jointly contain essentially the atoms necessary to complete at least two mutually fused rings (i.e. jointly share at least one atom in addition to the nitrogen shown).

It is therefore an object of my invention to provide new compositions of matter known as "bridgehead hydrazinium chlorides" or, more properly compounds to which the name "bridgehead-N-amino ammonium chlorides" can be ascribed.

In practicing my invention, for example, a gaseous mixture of chloramine and ammonia may be conveniently passed into a solution of the applicable bridgehead base. Alternately, if desired, a solution of chloramine may be mixed with a solution of the bridgehead nitrogen compound. The solution may be aqueous or anhydrous, the choice being determined by the nature of the starting material and the work-up procedure desired. Thus, an aqueous solution or suspension of the starting compound may be treated with chloramine until all the base has been converted to a water-soluble product. Evaporation, partially or completely, then yields the product, which is purified by standard procedures, e.g. recrystallization. When the reaction is conducted in anhydrous medium the starting base is usually in solution before chloramine treatment begins. Chloramine addition generally results in the formation of a solvent-insoluble bridgehead hydrazinium chloride. Chloroform is an excellent solvent for this purpose, although dimethylformamide is almost as effective and has the advantage of reduced volatility. Other chlorocompounds (e.g. trichloroethylene and chlorobenzene) are also useful, as are the aromatic hydrocarbons and nitrobenzene. It is obviously most convenient to use chloramine as a gas stream, stabilized with ammonia and, if desired, diluted with nitrogen. The reagent can, however, be used in solution, e. g. in aqueous solution as prepared in the first step of the Raschig process.

My invention provides such novel bridgehead N-amino-ammonium chlorides as 1-aminoquinuclidinium chloride (V) and N-aminocanadinium chloride (VI):

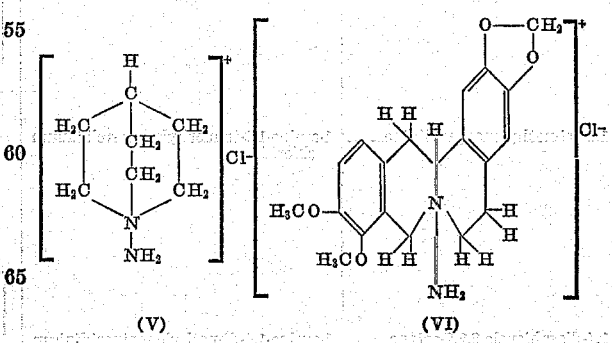

(V)      (VI)

My invention is not, however, limited to hydrazinium chlorides derived from the naturally occurring bridgehead-N-compounds, useful as they are. I have found that purely synthetic bridgehead amines can also yield these products, e.g.,

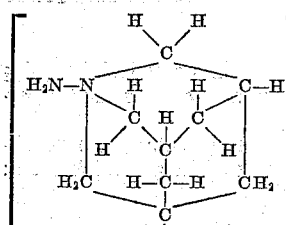

1-amino-aza (1) adamantaninium chloride
(VII)

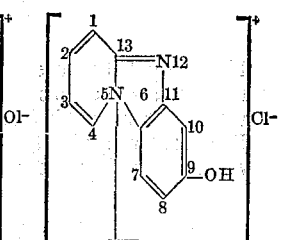

4-amino-9-hydroxypyrido-[1,2-a]-indolinium chloride
(VIII)

Other bridgehead nitrogen compounds suitable for preparation of N-amino ammonium chlorides are:

My invention is further illustrated by the following examples:

*Example I*

A generator was constructed to produce a gaseous mixture chloramine and ammonia with nitrogen as a diluent, if desired, using the process aforementioned of Harry H. Sisler et al. Such a mixture was passed into 150 ml. of a 10% aqueous solution of hexamethylenetetramine. Chloramine was consumed quickly and almost quantitatively by the solution, resulting in an exothermic reaction. Evaporation of the clear, light yellow solution gave 20.8 g. of hygroscopic, off-white solid, containing ionic chloride, and acting, in alkaline solution, as a strong reducing agent. Standard qualitative tests established that this was a mixture of ammonium chloride and desired product (1-aminohexamethylenetetraminium chloride). The solid mixture decomposed at 190–196° C. As determined by

TABLE I

| Bridgehead Amine | Name of Product | Bridgehead Portion of Product |
|---|---|---|
| Canadine<br>Coryldaline<br>Corybulbine | N-aminocanadinium chloride<br>N-aminocorydalinum chloride<br>N-aminocorybulbinium chloride | |
| Cinchonine<br>Cinchonidine<br>Quinine<br>Quinuclidine | N-aminocinchoninium chloride<br>N-aminocinchonidinium chloride<br>N-aminoquininium chloride<br>N-aminoquinuclidinium chloride | |
| Yohimbine<br>Reserpine<br>Yobrin | N-aminoyohimbinium chloride<br>N-aminoreserpinium chloride<br>N-aminoyobrinium chloride | |
| Strychnine<br>Strychnidine<br>Vomicine<br>Brucine | N-aminostrychninium chloride<br>N-aminostrychnidinium chloride<br>N-aminovomicinium chloride<br>N-aminobrucinium chloride | |
| Methenamine | 1-aminomethenaminium chloride | |
| 1,2-trimethylenepyrrolidine | 1-amino-1,2-trimethylenepyrrolidinium chloride. | |
| 1,4-diazabicyclo 2,2,2-octane | 1-amino-1,4-dimethylenepiperidinium chloride. | | chloride titration, it represented a 79% yield of 78% pure 1-aminohexamethylenetetraminium chloride. Its probable structure is given in the preparative reaction:

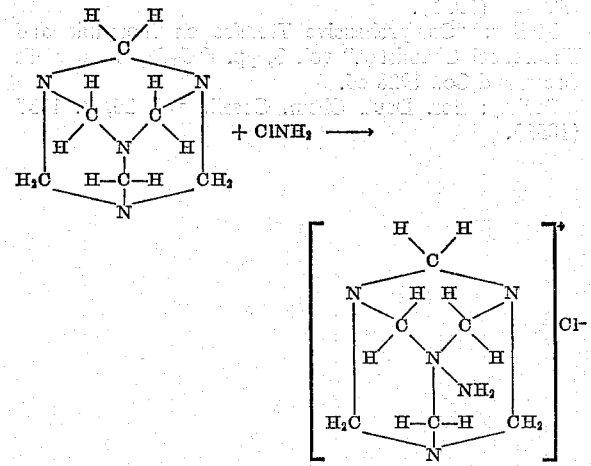

Partial extraction with 2-propanol gave a crude solvent-soluble product relatively free of ammonium chloride, melting at 167–180° C. Recrystallization of this partially purified hydrazinium chloride from 2-propanol-chloroform mixtures yielded a crystalline tan product, which decomposed at 207–208° C. This highly water-soluble bridgehead hydrazinium chloride, on addition of a saturated aqueous solution of potassium hexafluorophosphate gave as an immediate precipitate, crystalline white 1-aminohexamethylenetetraminium hexafluorophosphate, M.P. 203° C. with decomposition.

The structure of my novel chloride was elucidated by its hydrolysis to formaldehyde (identified as its 2,4-dinitrophenylhydrazone), ammonia, and hydrazine (identified as the azine of p-dimethylaminobenzaldehyde). Hydrolysis under varied conditions has given a variety of products, including substituted hydrazines. I have found that my novel and inexpensive chloride can be used to make copolymers. It is also of some potential value as a urinary antiseptic.

The use of chloroform as the reaction medium in lieu of water resulted in a somewhat slower, but cleaner reaction (viz., with fewer side reactions) with less hydrolysis but with no increase in yield. Use of dimethylformamide was less satisfactory, because of poor solubility characteristics (viz, reduced reactant solubility and increased product solubility).

*Example II*

A gaseous mixture of chloramine and ammonia, as described in Example I, was passed into 20 grams of brucine in 250 ml. of dimethylformamide. A white solid precipitated as the reaction proceeded. The solid portion was separated from the reaction mixture by filtration. Drying of this material gave 11.1 g. of crystalline off-white solid which, by chloride titration, was a 13.7% yield of mixed chlorides. The desired product, N-aminobrucinium chloride, was combined with roughly three times its weight of ammonium chloride in this mixture. Evaporation of the reaction filtrate yielded an additional 22 g. of the hydrazinium salt, almost 80% pure by chloride titration, resulting in an over all yield of about 85%. The novel bridgehead hydrazinium chloride which was recrystallized from absolute alcohol formed white crystals melting at 261–263° C., with sublimation above 180° C. Its amorphous, water-insoluble, hexafluorophosphate decomposes with gas evolution at 204° C., with sublimation above 178° C. N-aminobrucinium chloride is highly water-soluble, and relatively insoluble in chloroform (the parent alkaloid, brucine, shows the reverse solubilities). Although the structure of brucine has not been established, a possible structure for my product is:

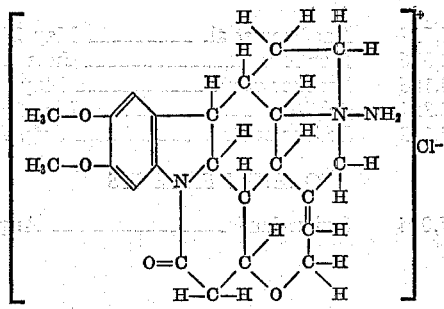

*Example III*

A solution of 25.9 g. of quinine in 150 ml. dimethylformamide, was treated in the manner described in Example II, with similar apparent results. The 5.6 g. of initial precipitate, a white solid melting above 280°, represented a 4.7% yield of mixed salts. The product, N-aminoquininium chloride, was again combined with about three times its weight of NH₄Cl. Evaporation of the filtrate yielded almost 50% of the desired product, which was freed of quinine contaminant by solution in water. Recrystallization from a modicum of water gave light brown needles, melting at 166–168° C. with decomposition. (Quinine, soluble to the extent of 0.15% in boiling water, decomposing at 171–175° C., gives a mixed melting point of 157–165° C. with the product.) The hexafluorophosphate derivative decomposes without definitive melting at about 200° C.

*Example IV*

A solution of 50 mg. 8 (or 9)-hydroxypyrido[2,1-b]benzimidazole (the preparation of which is described in Monatshefte, 83, 31 (1952)), in 20 ml. chloroform, was treated with 25 mg. ClNH₂ in 25 ml. ether. The reaction mixture was allowed to stand at 10–20° C. for 48 hours. In the interim all of the chloramine disappeared and a white solid formed. The solid, after being filtered and dried, weighed 38 mg. It decomposed without melting at about 230° C. Alcohol extraction gave a fair yield of an off-white solid, 5-amino-8-(or 9)-hydroxypyrido[2,1-b]benzimidazolinium chloride, which decomposed at approximately 163° C. I have ascribed to this product the formula:

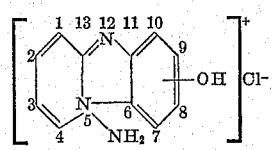

My invention provides a new class of potentially useful chemical compounds which can be readily prepared on a commercial basis. Certain parent bridgehead amines are extremely potent pharmaceuticals, e.g. the alkaloids strychnine, reserpine, and quinine. Since it has been shown that quaternization of many alkaloids yields potent pharmaceuticals, a great potential use for my novel class of compounds will be in that field. Other bridgehead hydrazinium chlorides, e.g. the product from hexamethylenetetramine, will be useful in the formation of condensation polymers. Still others, e.g. 5-amino-8-(or 9)-hydroxypyrido[2,1-b]benzimidazolinium chloride, are dyestuff intermediates; the product named is capable of forming an azo dye on treatment with an aryldiazonium salt.

I claim:

As a new composition of matter, 1-aminohexamethylenetetraminium chloride.

References Cited in the file of this patent

UNITED STATES PATENTS 2,542,315   Erchmeyer _____ Feb. 20, 1951

(Other references on following page)

UNITED STATES PATENTS

| | | |
|---|---|---|
| 2,554,737 | Haefliger et al. | May 29, 1951 |
| 2,640,826 | MacLean | June 2, 1953 |
| 2,744,106 | Brooker et al. | May 1, 1956 |
| 2,752,351 | Schlittler | June 26, 1956 |
| 2,758,113 | Zellner et al. | Aug. 7, 1956 |

FOREIGN PATENTS

| | | |
|---|---|---|
| 177,064 | Switzerland | Aug. 1936 |

OTHER REFERENCES

Chemical Abstracts, vol. 32, p. 3717[8] (1938) [Abstract of Coleman Proc. Iowa Acad. Sc., 43, 178 (1936)].

Berliner: J. Am. Water Works Assoc., vol. 23, pp. 1320–33 (1931).

Mellor: "Comprehensive Treatise on Inorganic and Theoretical Chemistry," vol. 8, pp. 605–607 Longman's Green and Co., 1928 ed.

Szuhay: Ber. Deut. Chem. Gesell., vol. 26, p. 1937 (1893).

UNITED STATES PATENT OFFICE

CERTIFICATE OF CORRECTION

Patent No. 2,891,060                              June 16, 1959

Bernard Rudner

It is hereby certified that error appears in the printed specification of the above numbered patent requiring correction and that the said Letters Patent should read as corrected below.

Column 3, line 7, after the right hand bracket of formula VII, for "Ol" read -- Cl --; line 13, beginning of the name of compound VIII, for "4-amino-9-hydroxypyrido-" read -- 5-amino-9-hydroxypyrido- --.

Signed and sealed this 13th day of October 1959.

(SEAL)

Attest:

KARL H. AXLINE
Attesting Officer

ROBERT C. WATSON
Commissioner of Patents